(12) United States Patent
Noel et al.

(10) Patent No.: US 8,944,400 B2
(45) Date of Patent: Feb. 3, 2015

(54) DEVICE FOR INSTALLING AND REMOVING AN AIRCRAFT ENGINE PRE-COOLER

(75) Inventors: Mathieu Noel, Gagnac sur Garonne (FR); Thomas Widemann, Toulouse (FR)

(73) Assignee: Airbus (S.A.S.), Blagnac (FR)

( * ) Notice: Subject to any disclaimer, the term of this patent is extended or adjusted under 35 U.S.C. 154(b) by 121 days.

(21) Appl. No.: 13/434,338

(22) Filed: Mar. 29, 2012

(65) Prior Publication Data
US 2012/0298835 A1 Nov. 29, 2012

(30) Foreign Application Priority Data

Mar. 29, 2011 (FR) ...................................... 11 52599

(51) Int. Cl.
| | | |
|---|---|---|
| *B64D 27/00* | (2006.01) | |
| *F02C 7/20* | (2006.01) | |
| *B64F 5/00* | (2006.01) | |
| *B64D 33/08* | (2006.01) | |
| *F02C 7/32* | (2006.01) | |

(52) U.S. Cl.
CPC ................. *F02C 7/32* (2013.01); *Y02T 50/671* (2013.01); *B64F 5/0036* (2013.01); *F05D 2230/70* (2013.01); *B64D 33/08* (2013.01)
USPC .......................................... 248/544; 60/796

(58) Field of Classification Search
USPC .......... 248/220.21, 220.22, 544, 546; 60/796, 60/797, 798
See application file for complete search history.

(56) References Cited

U.S. PATENT DOCUMENTS

| | | | |
|---|---|---|---|
| 2,750,142 A | 6/1956 | McKee | |
| 3,825,623 A | 7/1974 | Kline | |
| 4,342,439 A | 8/1982 | Brunder | |
| 5,031,396 A | 7/1991 | Margnelli | |
| 5,249,417 A * | 10/1993 | Duesler et al. ................. | 60/772 |
| 5,435,124 A * | 7/1995 | Sadil et al. ...................... | 60/796 |
| 6,415,610 B1 * | 7/2002 | Parker ............................. | 60/798 |
| 7,296,414 B2 * | 11/2007 | Stretton et al. ................. | 60/797 |
| 7,607,609 B2 * | 10/2009 | Levert ............................. | 244/54 |
| 7,789,344 B2 * | 9/2010 | Cousin et al. .................. | 244/54 |
| 7,797,947 B2 * | 9/2010 | Lafont et al. ................... | 60/796 |
| 7,950,604 B2 * | 5/2011 | Combes et al. ................. | 244/54 |
| 8,256,708 B2 * | 9/2012 | Guillet et al. .................. | 244/54 |

OTHER PUBLICATIONS

International Search Report corresponding to PCT International Application No. PCT/US92/07574, dated Dec. 4, 2012.
International Preliminary Report on Patentability, dated Jan. 16, 2012.

* cited by examiner

*Primary Examiner* — Steven Marsh
(74) *Attorney, Agent, or Firm* — Jenkins, Wilson, Taylor & Hunt, P.A.

(57) ABSTRACT

The present invention relates to a device (20) for installing and/or removing a pre-cooler (16) of an aircraft engine (10). Said device comprises, in a position of use, a mounting flange (22) supported in use by a pylon of an aircraft, at least a floor (68) supporting a pair of guiding arms (24), a ramp (26), a basket (32) for receiving said cooler (16) and adjustable support means (30) of said cooler for removing or mounting said cooler on pylon (16).

9 Claims, 12 Drawing Sheets

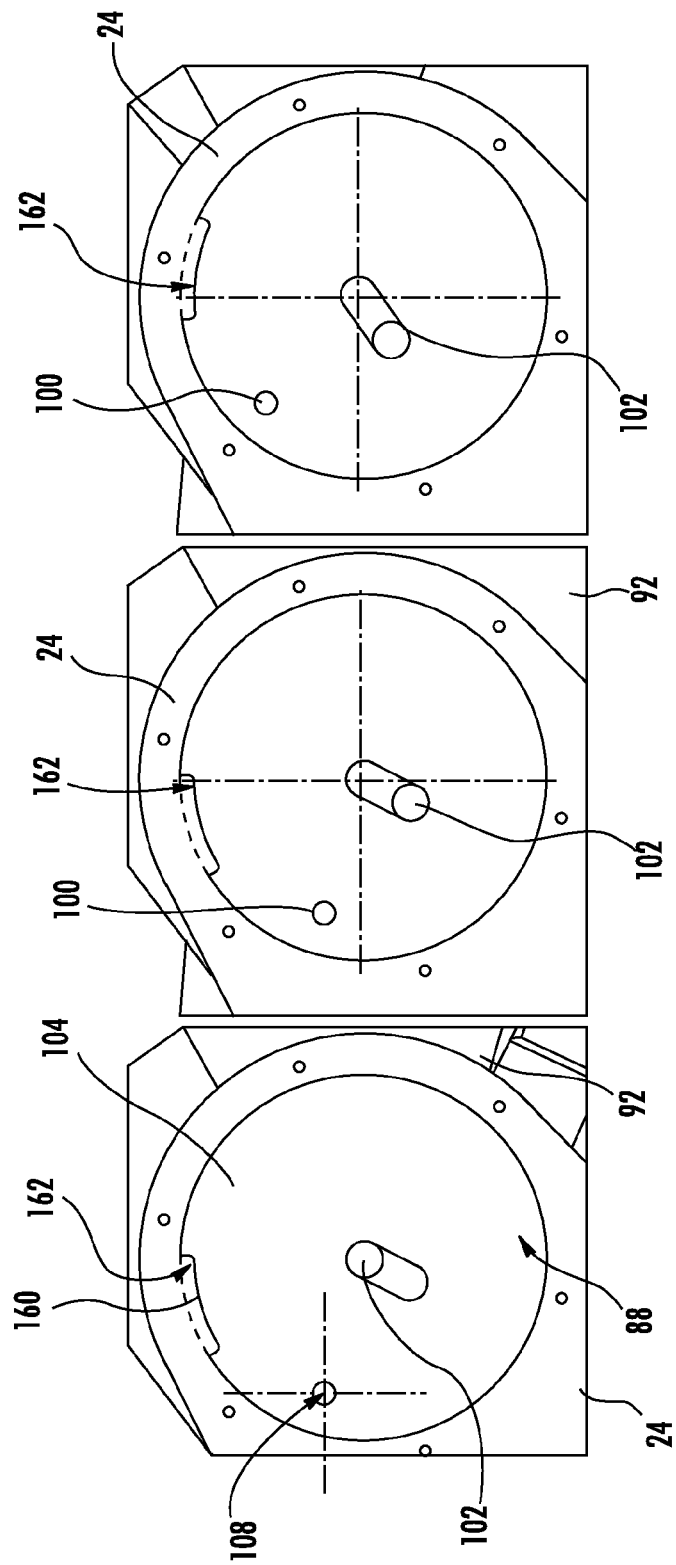

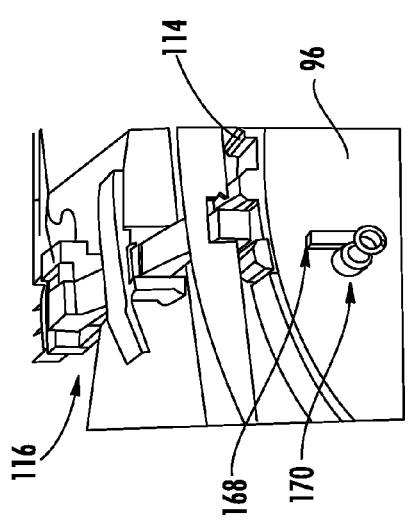
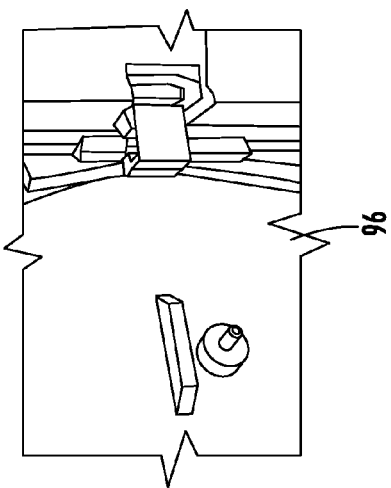
FIG. 20
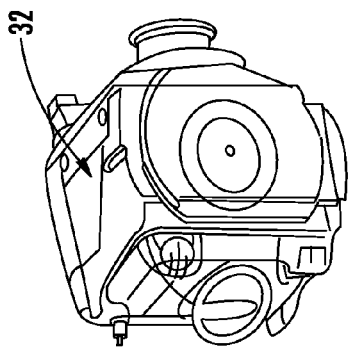
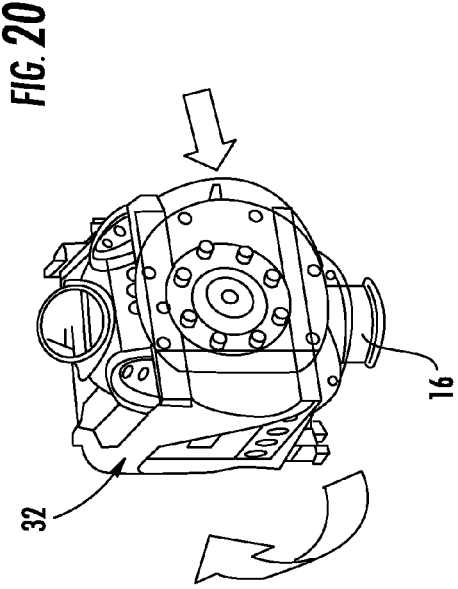
FIG. 21

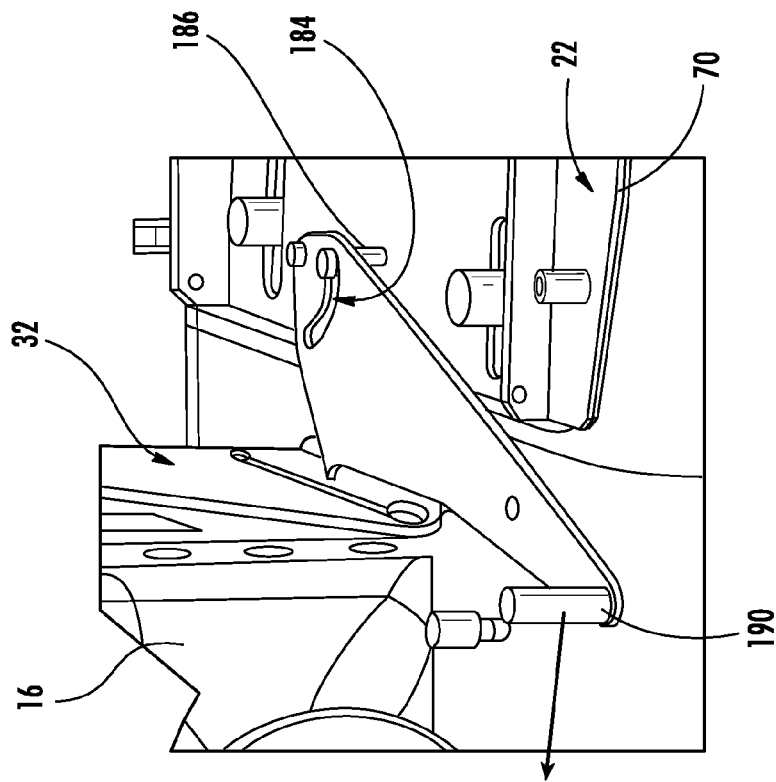
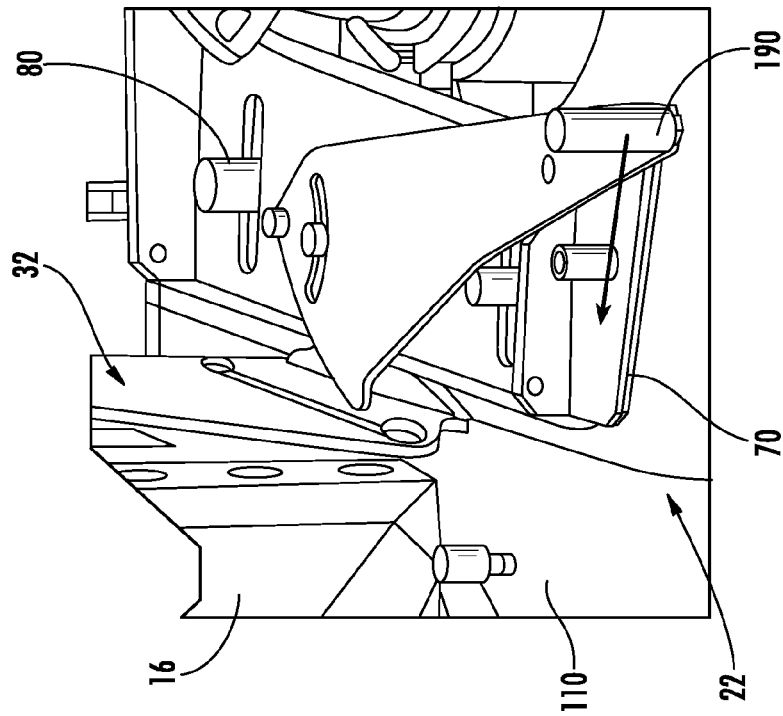

DEVICE FOR INSTALLING AND REMOVING AN AIRCRAFT ENGINE PRE-COOLER

CROSS-REFERENCE TO RELATED APPLICATIONS

This application claims the benefit of and priority to French Patent Application No. 1152599, filed Mar. 29, 2011, the entire disclosure of which is herein incorporated by reference.

The invention relates to the installation and removal of aircraft engine pre-cooling devices.

An aircraft is known to have on board a heat exchanger called a pre-cooler. The pre-cooler is generally mounted between the engine and thrust rods. This environment makes it difficult to remove the pre-cooler when it needs repairs or replacement, and then to reinstall the pre-cooler or another pre-cooler. Indeed, given the location of the pre-cooler in the vicinity of the engine, its removal requires prior removal of at least a thrust rod, a thrust reverser cowling, or the engine. Given also the mass and relatively large volume of the pre-cooler, its installation and removal are delicate operations.

One object of the invention is to facilitate the mounting and removing operations of an aircraft pre-cooler.

To this end a first object of the present invention relates to a device for mounting and/or removing an aircraft engine pre-cooler, wherein it comprises an in-use base position resting in-use on a pylon of the aircraft, on at least a floor holding a pair of guiding arms, a ramp, a basket for receiving said cooler and adjustable supporting means of said cooler for disassembling or mounting said cooler on pylon.

With this device, during the pre-cooler disassembly, it is held by the pylon and guided with respect to the latter. The operator can thus focus his attention exclusively on the speed provided to the pre-cooler for precisely controlling its movement.

Preferably, the device further comprises a handle attached to the pair of arms and a positioning device for controlling the pre-cooler displacement on the ramp.

According to another preference, the support member comprises a jack mounted respectively on a support plate attached in the position of use to a part of the pylon, and a supported plate attached to the pre-cooler in the position of use.

Advantageously, the basket comprises a bottom and a disc mounted movably in rotation relative to the bottom round an axis perpendicular to a face of the disk, and wherein the basket further comprises rotation self-disengaging locking means.

Preferably, each guiding arm is mounted hinged onto the basket through a disc guiding the basket in the position of use relative to the base along two circular arcs having different centers.

A second object of this invention relates to a method for removing a pre-cooler of an aircraft implementing a device according to the first object of the invention, wherein the method comprises the following steps:
 a) installing support means,
 b) installing the base over thrust rods,
 c) installing the basket round the pre-cooler,
 d) attaching the guiding arms to the basket then to the base,
 e) removing the pre-cooler,
 f) moving support means for guiding the pre-cooler along a trajectory comprising two circular arcs extending in the same vertical plane and having different centers,
 g) rotating the pre-cooler over the basket, and
 h) removing the pre-cooler over the ramp.

Thus, the pre-cooler is still supported by the aircraft structure during its movement relative to said structure for its removal or installation. It is not necessary to provide, independently of the aircraft, means that alone are able to hold the pre-cooler during the displacement. Moreover, the operator can focus his attention on guiding the pre-cooler movement and even, when such guidance is provided by proper means, on solely the speed of the pre-cooler movement. The weight of the latter being supported by the aircraft structure, its movement is particularly simple to control and may therefore take place in the presence of the engine, thrust rods and thrust reverser cowling, without having to remove these major parts.

A final object of this invention relates to a method for installing a pre-cooler of an aircraft implementing a device according to the first object of this invention, wherein the method comprises the following steps:
 a) installing the base over thrust rods,
 b) installing the bracket round a pre-cooler,
 c) installing a ramp on the pylon,
 d) attaching guiding arms to the basket,
 e) installing the handle on the pre-cooler and the positioning device,
 f) mounting the pre-cooler equipped with the basket on the base, and rotating the basket on the base,
 g) mounting guiding arms on the basket and the base,
 h) installing support means,
 i) moving support means driving the basket movement through the guiding arms, and attaching the pre-cooler to the pylon.

Other features and advantages of the invention will become apparent from the following description of an embodiment provided by non limiting examples, with reference to the accompanying drawings in which:

FIGS. 14 through 16 are three views showing positions of the guiding means during said move;

FIGS. 20 and 21 illustrate the pre-cooler in the respective configurations of FIGS. 17 and 18, in both an overview and a detailed view;

FIGS. 22 and 23 illustrate the maneuver of the device during the implementation of the method for installing the pre-cooler;

Figure 1:
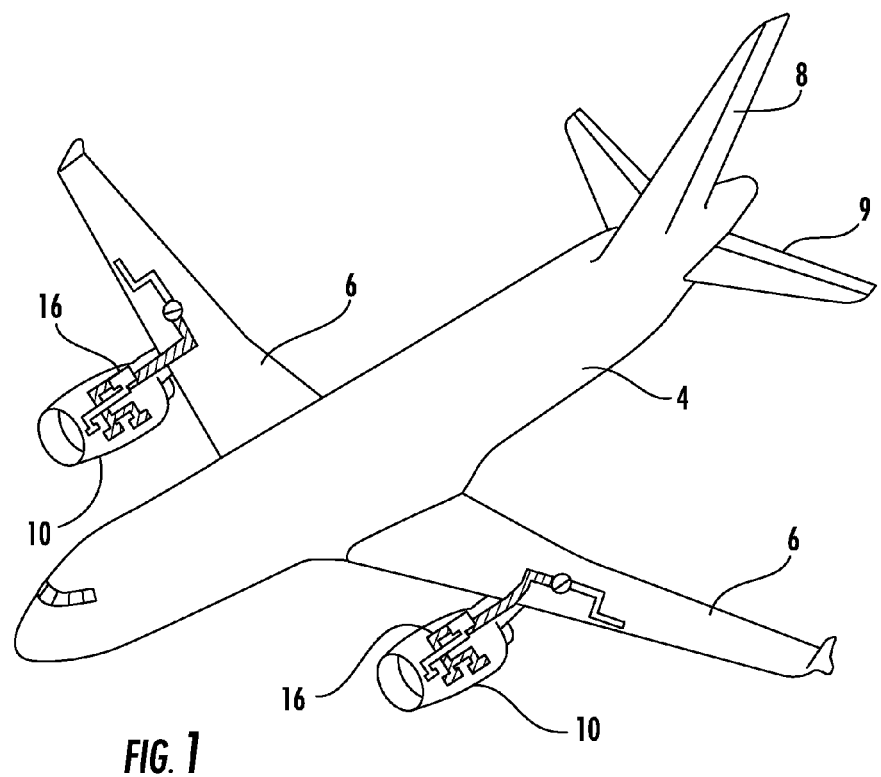
FIG. 1 is a perspective view of an aircraft illustrating schematically the position of the heat exchangers or pre-cooler.

Illustrated in FIG. 1 is an aircraft comprising a fuselage 4, two wings 6, a vertical tail 8, a horizontal stabilizer 9 and reactors 10 (in the example shown, two reactors) respectively mounted on wings 6.

Figure 2:
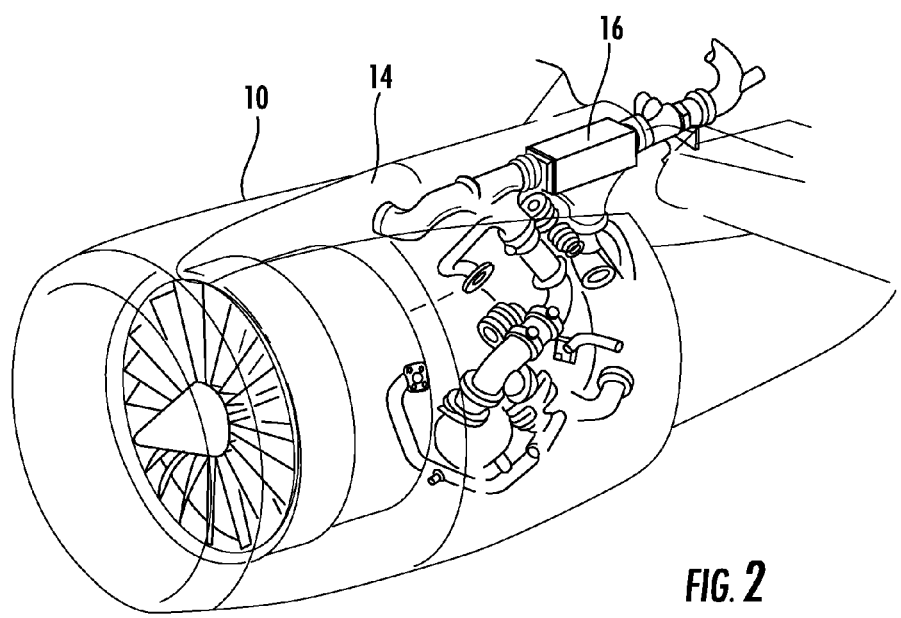
FIG. 2 is a schematic view of a reactor of the aircraft in FIG. 1
Figure 3:
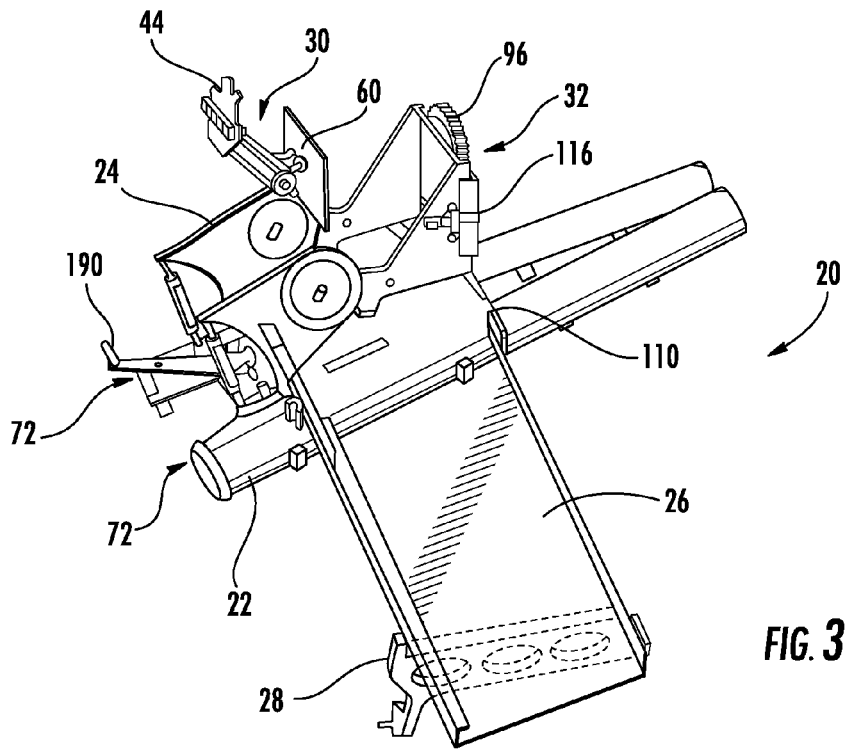
FIG. 3 is a perspective view of a device for installing and removing a pre-cooler according to the present invention.
Figure 4:
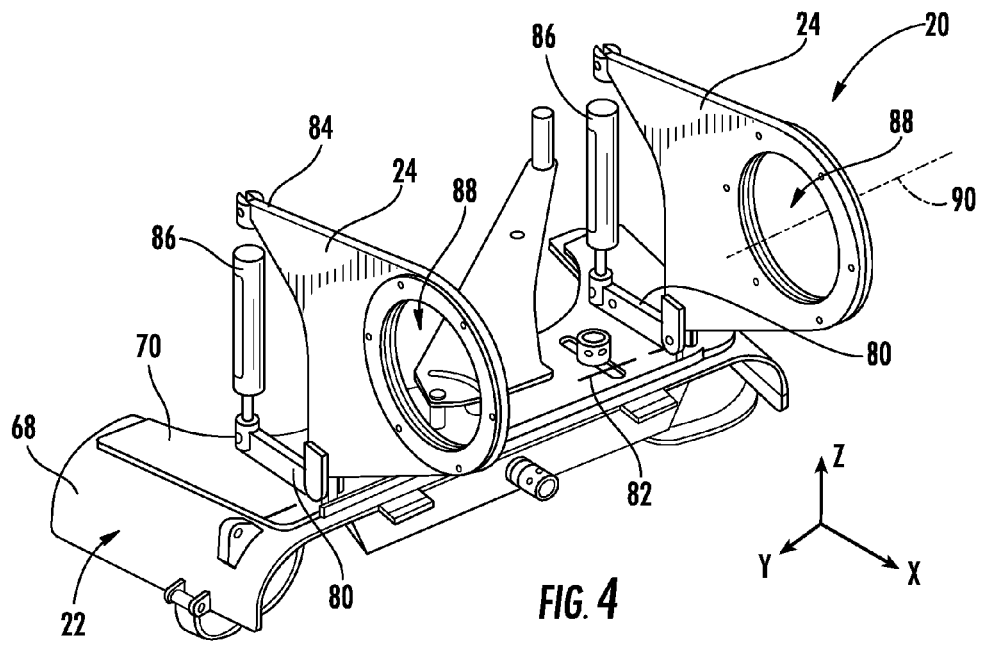
FIGS. 4 through 7 are perspective views of different parts of the device in FIG. 3.

An X, Y, Z orthogonal reference frame is used, where X and Y are the horizontal directions respectively parallel and perpendicular to the longitudinal direction of the fuselage, and Z is the vertical direction. As illustrated in FIG. 2, each of the reactors or engine 10 is associated with a pre-cooler 16 having a crankcase presenting substantially a general box shape. Conventionally, reactor 10 and pre-cooler 16 are carried by the corresponding wing via a pylon 14. FIGS. 3 to 7 illustrate a device 20 for installation and removal of a pre-cooler according to the invention. This device 20 comprises a mounting flange 22, a pair of guiding arms 24, such as a slide-like ramp 26, a stand 28 supporting the latter, adjustable supporting means 30, a rear floor 110 and a basket 32.

The support means comprise a jack 30 comprising two clevis 34 and 36, adapted to be mounted respectively on a support plate 44 and a carried plate 60. Jack 30 includes two pairs of arms 38 and 40. The arms of the first pair 38 are hinged to each other through one of the arms' end. One of the arms is articulated through its other end to clevis 34 while the other arm is articulated through its other end to clevis 36. In the same way, the arms of the other pair 40 are articulated to clevises 34 and 36 round the same axes of rotation and in a manner identical to first pair 38. These axes of rotation are also parallel to one another.

As it is known, the adjacent ends of the arms of first pair 38 are connected to adjacent ends of the arms of second pair 40 through a threaded rod engaged with a nut of one of the arm pairs and mounted rotatingly but steady with sliding relative to the other pair of arms. The rod is likely to be operated in rotation through a crank 42 in order to bring the arm pair ends close or move them away.

Figure 8:
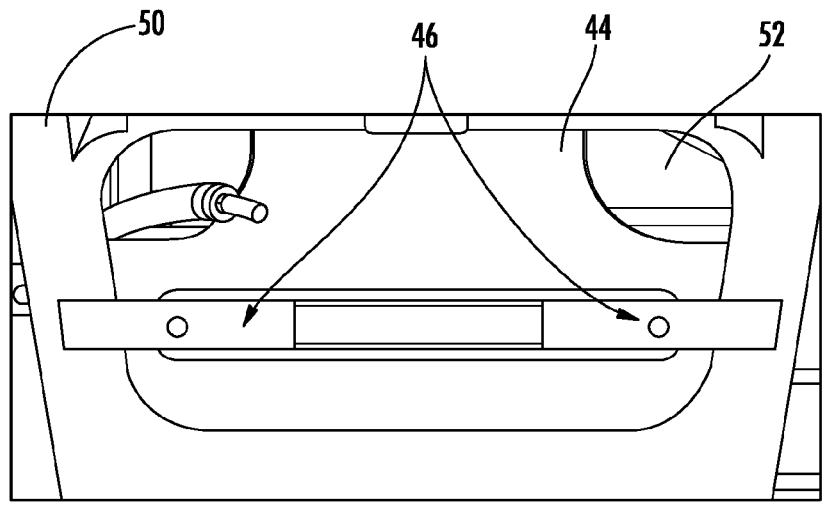
FIGS. 8 and 9 are views showing respectively the locking means of part of the device and the attachment of a jack for the device in FIG. 3 during the implementation of the method of the invention.

Support plate 44 is provided with two latches 46 (FIG. 8) capable of sliding respectively in a groove on the plate. Each latch 46 is associated with a controlling and tightening handle 48, shaped as a nut in the example shown, by means of a threaded rod passing through the plate at groove level.

Figure 9:
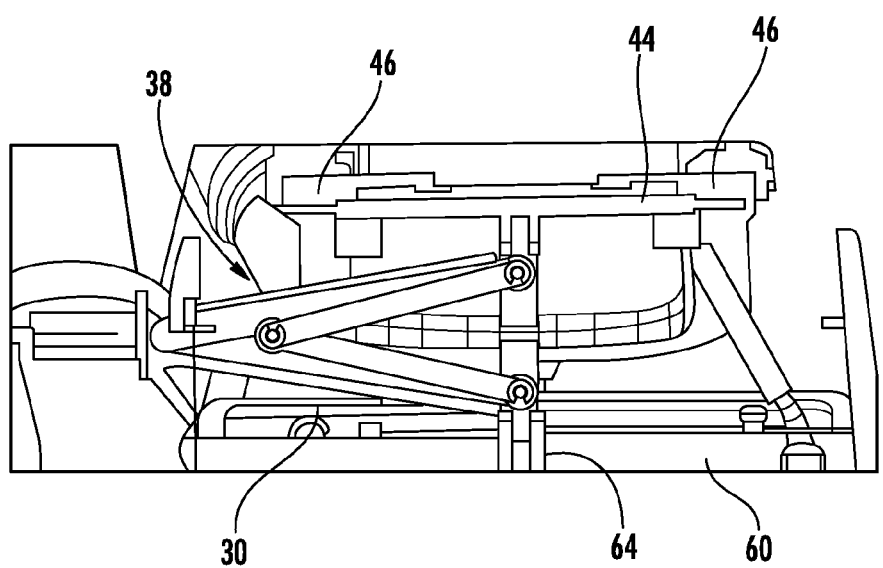
Figure 11:
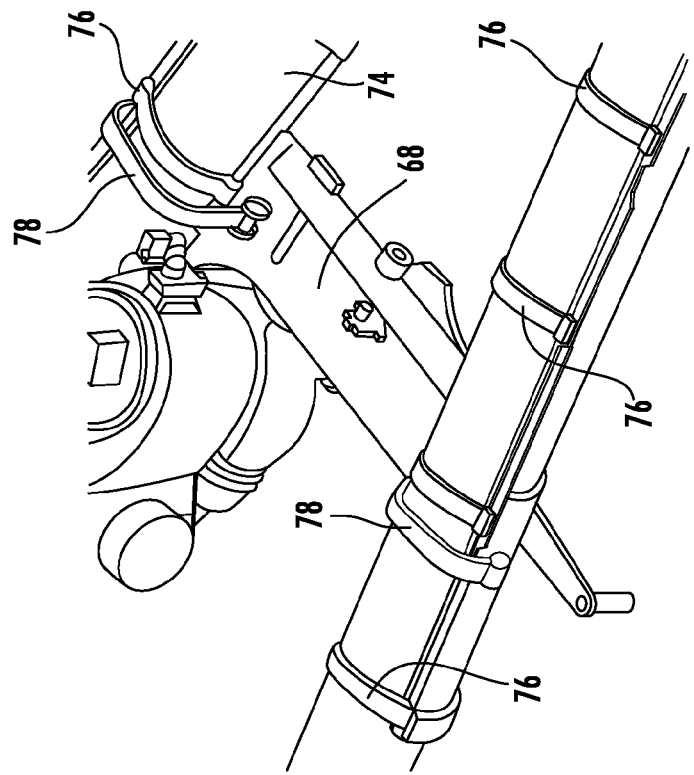
FIGS. 10 and 11 are two perspective views illustrating the attachment of a mounting flange for the device in FIG. 3.
Figure 10:
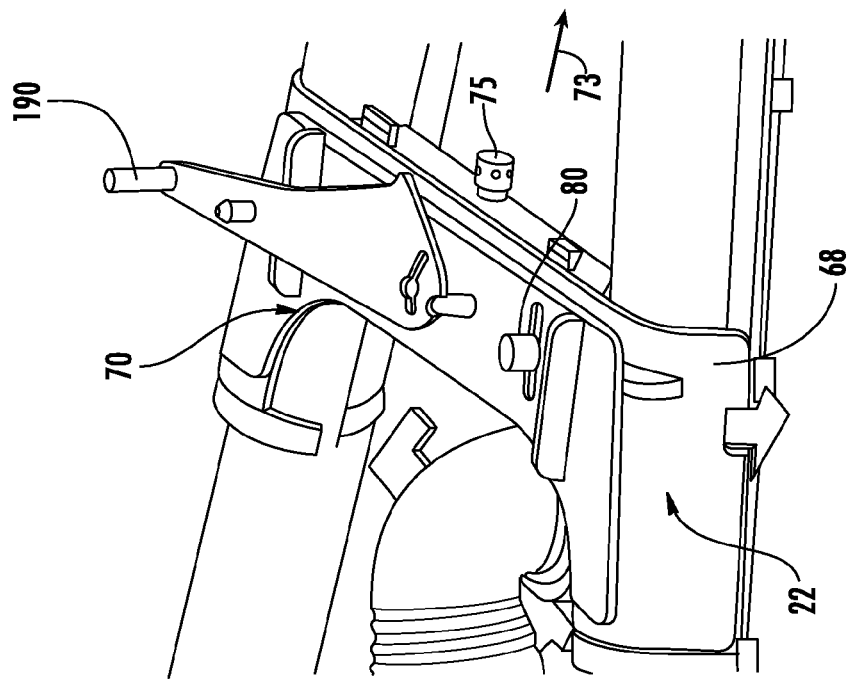

Carried plate 60 includes openings 62 arranged at the periphery of the plate and a mounting flange 64 arranged on one of its faces for attaching carried plate 60 to clevis 36 using a rod passing through the latter, as seen in FIG. 9.

Mounting flange 22 further includes a cowling 66, a front floor 68 and an arm support 70.

Cowling 66 comprises two elongated legs 72 each having a cross-section shaped as a circular arc. Both legs 72 are rigidly attached to each other by means of front floor 68 which lies over both legs.

Mounting flange 22 also includes rigid attachment means of legs 72 on engine thrust rods 74. In the example shown, the attachment means comprise a plurality of hook-loop type strips 76 distributed along the leg and a strap 78 engaged with leg 72 surrounding corresponding rod 74. Strap 78 is provided with a loop for closing and tightening it around rod 74.

Arm support 70 is generally flat and is rigidly attached to floor 68, against an upper face of the latter. This attachment is provided by a sliding connection of support 70 in relation to floor 68, said sliding occurring along a direction 73 parallel to the face plane of these two parts in mutual contact, and the vertical symmetry plane of the rods. Guiding is performed by reliefs of floor 68 entering two straight grooves through the thickness of support 70. Tightening means with screws 75 connect the floor and the support, and are used to immobilize them rigidly together once the relative desired position is reached.

Each guiding arm 24 has a generally planar shape and is articulated round a horizontal axis 82 on a rear portion of a respective elongated relief 80 protruding from the upper surface of support 70. Each guiding arm 24 further includes a front end 84 hinged round a rotation axis parallel to the Y direction, at the end of a jackscrew rod. The jackscrew further comprises a body which is also pivotally mounted round a rotation axis at the front end of corresponding relief 80. Guiding arms 24 are parallel and spaced from each other. Each of the arms is also provided at its front end with a circular opening 88 which axis 90 is perpendicular to the plane of the arm and parallel to the Y direction.

Each opening 88 coaxially accommodates a disc 104 mounted movably in rotation with respect to guiding arm 24 round axis 90. Disc 104 includes an oblong, non-rectilinear opening in the general form of a bean extending from the center of the disc and towards an edge of the latter. Disc 104 includes an opening 108 which central axis is distant from rotation axis 90 of the disc.

Figure 7:
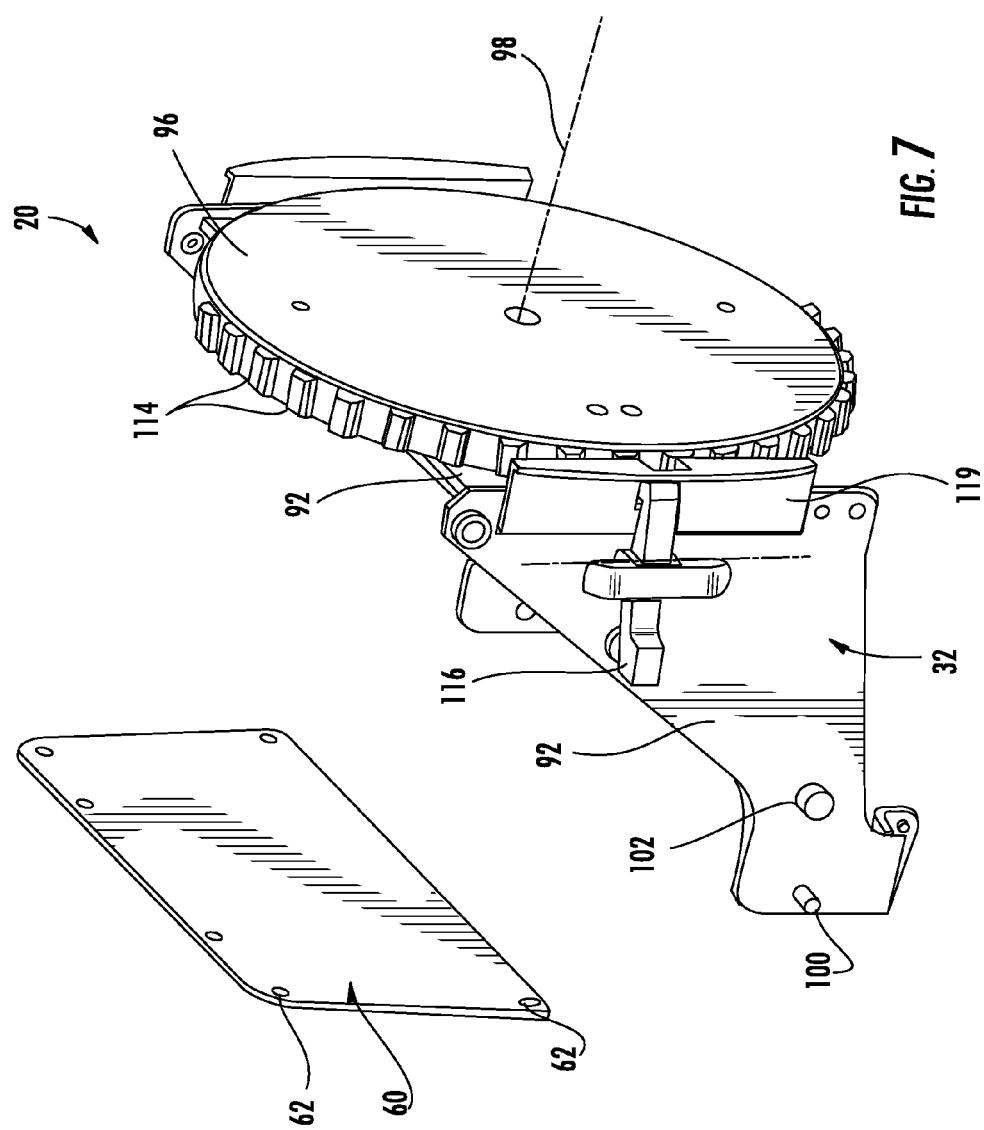

As illustrated in FIG. 7, basket 32 includes two side walls 92, a bottom wall 94 linking one to the other the rear ends of walls 92, and a disc 96 mounted movably in rotation round an axis 98 relative to bottom wall 94.

Each side wall 92 holds protruding from its outer side a front lug 100 and a rear lug 102 both extending in the front part of the wall. The two lugs have different diameters, with that of rear lug 102 being greater than that of front lug 100. Each side wall 92 is connected to corresponding guiding arm 24 by introducing lugs 100 and 102 through the openings in disk 104, as will be described in detail in the continuation of the description.

Figure 17:
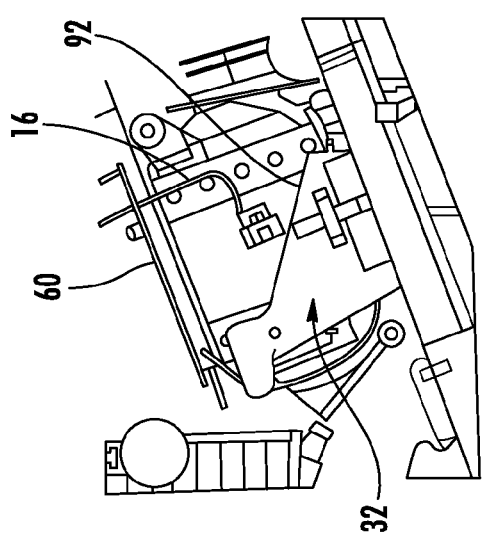
FIGS. 17 to 19 are views showing three other configurations of the pre-cooler during the implementation of the method.
Figure 18:
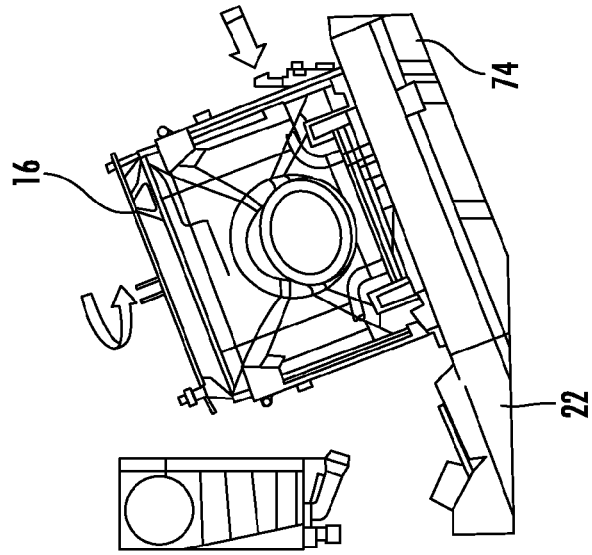
Figure 19:
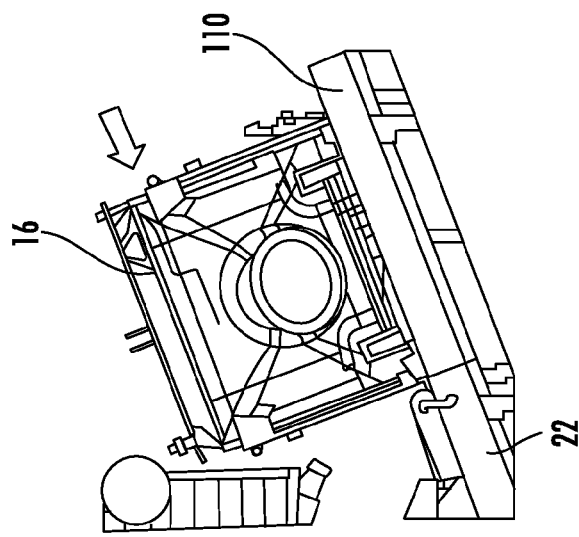
Figure 24:
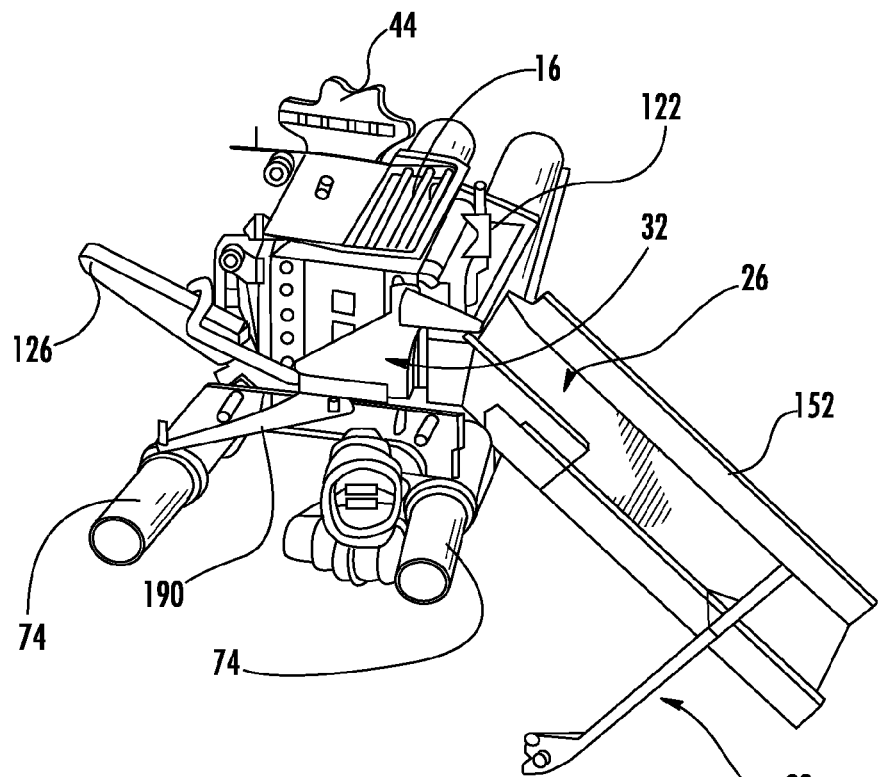
FIG. 24 is a perspective view of the device with the pre-cooler in a evacuation position.

Disc 96 displays on its periphery teeth 114 protruding in a direction radial to axis 98. One of walls 92 (as seen in FIGS. 17 and 18) carries on its outer face a clasp 116. Clasp 116 has a quill capable of moving between a closed position, wherein said quill is engaged through an opening in a plate 119 with the spaces between teeth 114, and a resting position, wherein said quill is recessed with regards to disk 96, thus allowing the latter to rotate.

Figure 5:
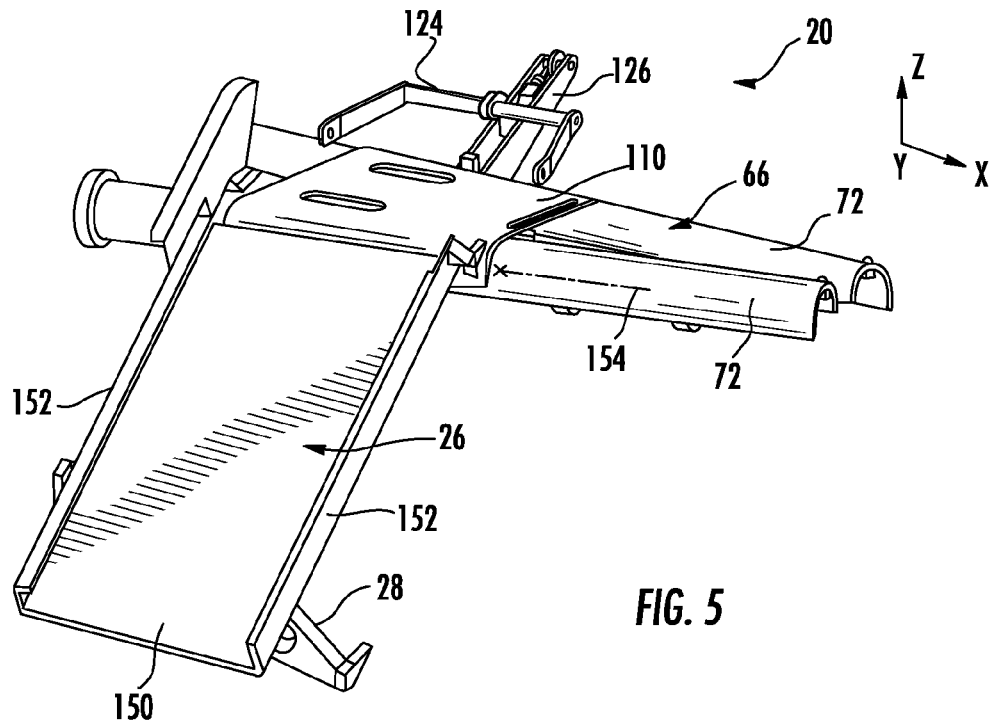
Figure 6:
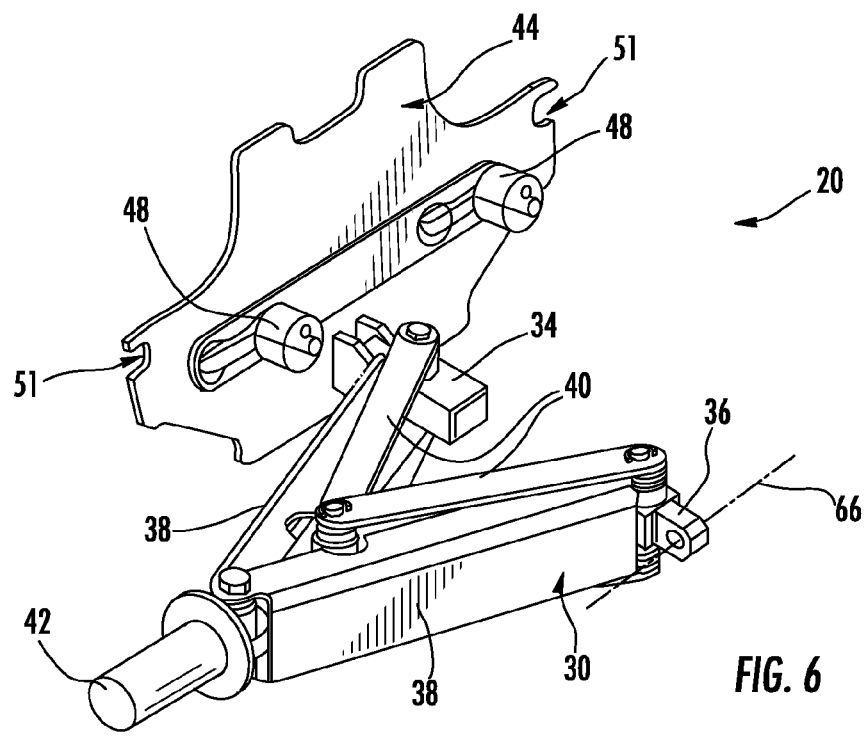

Slide 26 comprises a flat main wall 150 whose upper surface forms a sliding surface for sliding the pre-cooler. This wall extends with lateral edges 152 for guiding the pre-cooler sliding to the lower end of the slide and preventing it from exiting the slide through the lateral edges. The slide is mounted to rear floor 110, hinged to the latter round an axis 154 parallel to the geometric axis of leg 72 closest to the slide (as shown in FIG. 5).

The removal method of the pre-cooler will now be described in relation to FIGS. 12 to 25.

Note that before implementing the method, device 20 is independent from the aircraft and entirely dismounted while pre-cooler 16 is rigidly secured in place on the aircraft pylon.

In a first step of the method, support means 30 are installed on the aircraft pylon.

Latches 46 of support plate 44 are initially recessed from the edges of plate 44. During this step, plate 44 is pressed against one face of deck 50 while moving the latches through an aperture 52 formed in said face. Note that deck 50 has locating pegs 49 capable of penetrating into corresponding cut-outs 51 of the opposite side edges of plate 44 to uniquely define the position of the plate with respect to deck 50.

Handles/nuts 48 are then maneuvered for moving each lock 46 relative to support plate 44 so as to rigidly attach support plate 44 to deck 50.

Clevis 34 of jack 30 is then mounted to plate 44 by means of articulation 54.

In the same way, carried plate 60 is rigidly mounted to pre-cooler 16 with screws passing through openings 62 of the plate and the crankcase of pre-cooler 16. Carried plate 60 is also pivotally mounted on jack 30.

So installed jack 30 thus connects pre-cooler 16 to pylon 14 independently of rigid attaching means of pre-cooler 16. Mounting flange 22 is then laid over the thrust rods in a position where legs 72 cover part of the length of respective rods 74, and is attached to the latter through strip 76 and strap 78 thus ensuring a stable position for mounting flange 22.

Walls 92 of basket 32 are then secured to respective guiding arm 24 by inserting the lugs 100 and 102 into corresponding disk 104.

Guiding arms 24 are then mounted on mounting flange 22 by connecting them with reliefs 80.

Thanks to jackscrews 86, the position of arms 24 is adjusted so that rear lug 102 is occupying the center of disc 104 in the corresponding opening 106. Also this type of adjustment is performed so that basket 32 is placed against the crankcase of pre-cooler 16, walls 92 being in contact against the side walls of said crankcase while the bottom rests against a rear wall of said crankcase. Basket 32 thus forms a cradle for receiving the pre-cooler.

Rear floor 110 is then installed over mounting flange 22 covering both legs 72 as well as, like front floor 68, extending backwardly from floor 68 and under pre-cooler 16.

The screws fastening pre-cooler 16 to the pylon are then removed. During this step, pre-cooler 16 remains stationary but its weight is gradually transferred over support means 30 on the one hand, and basket 32 and mounting flange 22 on the other.

Crank 42 of jack 30 may then be operated so as to pull away clevis 34 and 36 from one another for displacing pre-cooler 16 from its position of use. During this operation pre-cooler 16 drops down under its own weight while being guided in its trajectory using device 20.

This descent is carried out through a trajectory in a circular arc in a vertical plane, with a rotational movement round the axis defined by front lug 100 in opening 108, rear lug 102 running across oblong opening 106, away from axis 90. At this stage, each disc 104 remains stationary in corresponding arm 24. In this case, it is a rotation over a 20° angle whose beginning and end are shown in FIGS. 14 to 16. Once back lug 102 has run across the whole oblong opening 106, the remaining of the descent of pre-cooler 16 is then done by a rotational movement round axis 90, through the rotation of disc 104 in opening 88, and through the torque exerted by the pre-cooler on each pair of lugs 100 and 102. In the example illustrated, this rotation takes place over a 26.57° angular sector up to the position in FIG. 16.

Disk 104 of each arm has a cutout 160 in its perimeter within which a relief 162 rigidly secured to the arm wall is located. It follows that the disc rotation relative to the arm round axis 90 is limited by the abutment of relief 162 against one or the other end of the cut which is shaped as a circular arc. During the descent along the second circular arc, relief 162 initially abuts against the cut end closest to disc 96, runs across the whole cut to be placed in abutment against its other end. Once this shoe reached, the basket itself reaches the end of its excursion relative to the arms, which indicates the arrival of the pre-cooler in a lower position.

Figure 13:
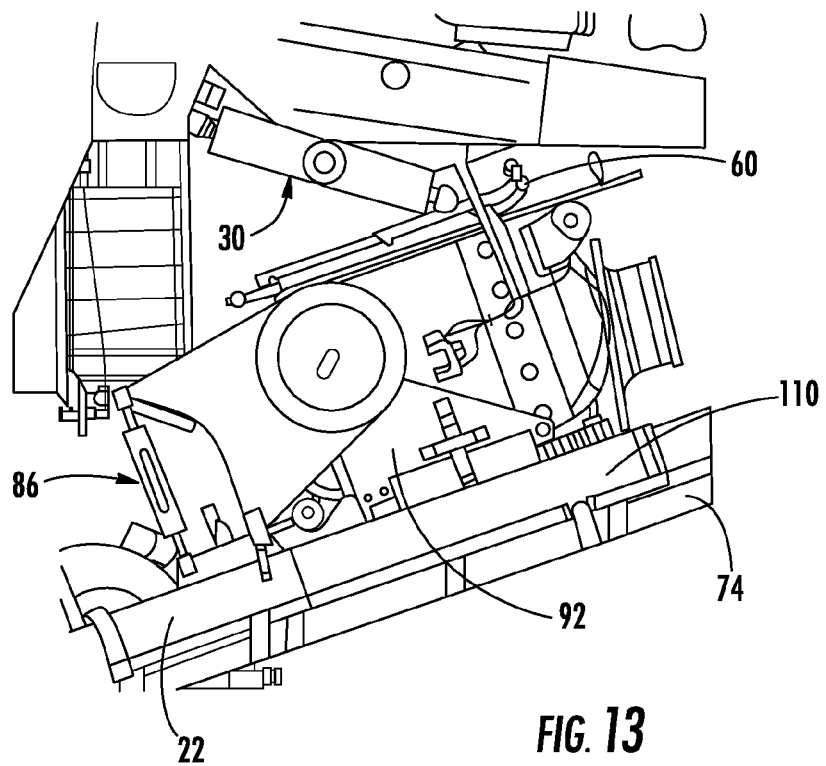

At the end of this second rotation, pre-cooler 16 is in contact with rear floor 110 as shown in FIG. 13.

Figure 12:
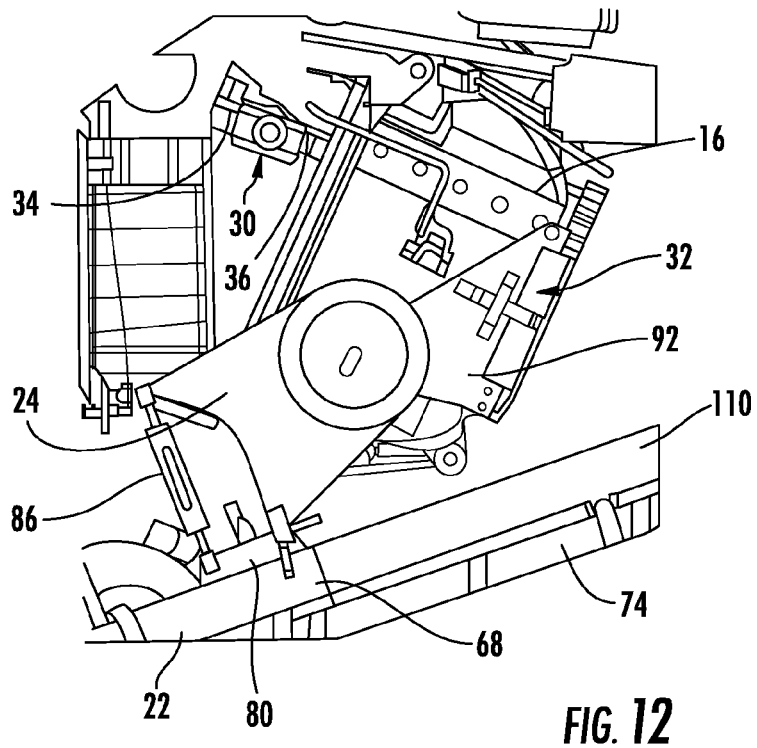
FIGS. 12 and 13 are elevation views showing two positions of the pre-cooling while it moves during the implementation of the method.

Pre-cooler 16 movement thus follows a trajectory consisting of a first circular arc corresponding to the first rotation and a second circular arc corresponding to the second rotation (FIG. 12 and FIG. 13). This trajectory prevents the pre-cooler from hitting some elements mounted on the aircraft pylon. Note that the pre-cooler movement is operated at all times by maneuvering the jack.

Pre-cooler 16 being supported by rear floor 110 and held in position by arms 24, jack 30 is then separated from the pylon on the one hand and from the pre-cooler on the other.

The next step in the method uses mounting flange 32 and in particular the rotation of disk 96 relative to the bottom.

Clasp 116 being in closed position preventing disc 96 rotation relative to the bottom, it is moved in open position in order to rotate the pre-cooler with walls 92 and bottom over a quarter turn, relative to disk 96 round axis 98. The beginning and the end of this rotation are shown in FIGS. 17 to 20. This rotation will place the pre-cooler in a position that again prevents it from striking pylon elements during the rest of its move.

As illustrated in FIGS. 20 and 21, it can be predicted that the two positions of the basket relative to the base, separated by a quarter turn with respect to one another, are identified by two respective openings 166, 168 of disc 96 wherein cylinder 170 engages, mounted for moving slidably on the bottom of the basket parallel to the direction of axis 98, and capable of penetrating into one or the other of openings 166 and 168 when one of the two positions is reached. In a next step of the method, the assembly formed by pre-cooler 16 and the basket is caused to slide in a forward and down direction on rear floor 110 until abutting this assembly against arm support 70.

Then finally, for evacuating the pre-cooler on slide 26, a handle 122 is attached to the basket. Both ends of the handle are attached to respective walls 92, for example by means of lugs 100 and 102. Handle 122 has a general "U" shape and bypasses the pre-cooler at a distance away from it. Handle 122 is for maneuvering the pre-cooler during this step. Also mounted to the basket is an arm 124, both respective ends of which are identically attached to respective walls 92 and which also bypass the pre-cooler at a distance away from it.

Figure 25:
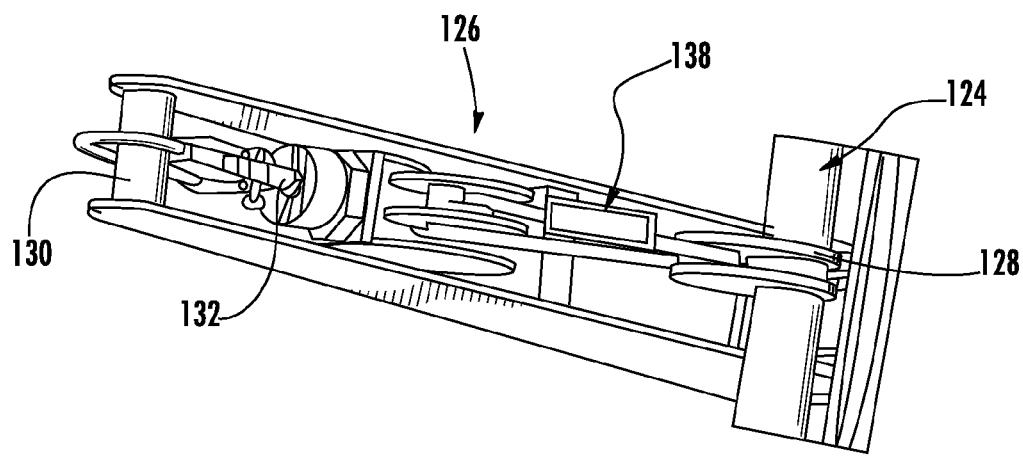
FIG. 25 is a detailed view of a positioning device used for evacuating the pre-cooler.

A positioning device illustrated in particular in FIG. 25, is also used to evacuate the pre-cooler on the slide. This device comprises a frame 126 having an elongated shape. A proximal end 128 of said frame is firmly connected by removable means to the rear floor. The distal end 130 of the frame serves as attachment point for a block 132. The latter comprises pulleys for passing a rope 134. Arm 124 serves to support a rotary roller 136 around which also passes rope 134. Between the caster and the block, the rope also passes through a ratchet lowering device 138, as illustrated in detail in FIG. 29. An end section of the rope escapes downwards beyond distal end 130 of the support and, as shown in FIG. 28, has a knot 140 limiting the excursion of the rope in the positioning device, and hence the excursion of the pre-cooler. The other end of the rope is attached to the block by means of a becket 139. The pre-cooler carried by the basket is supported by the rope forming a loop in roller 136. The ratchet lowering device is to control the movement of the pre-cooler as it slides on wall 150 of slide 26. It receives the pre-cooler at the end of the ramp formed by slide 26.

Note that a pre-cooler installation according to the method of the invention is achieved by performing the operations in reverse to those of the removal as described above. In summary, we therefore lift the pre-cooler by reeving it on the slide and floor 110. Then it is pushed to bring it up above floor 110. The pre-cooler with the basket is rotated a quarter turn, then raised by means of the jack while guiding its movement with the side arms.

During the implementation of the method for installing the pre-cooler, the disk is initially located in the configuration in which back lug 102 extends away from axis 90.

At the beginning of the guiding movement of the pre-cooler, the disc remains in position relative to the arm, and wall 92 rotates relative to the arm round the axis formed by front lug 100 until rear lug 102 extends coaxially with axis 90. As the upward movement of the pre-cooler continues, the movement of wall 92 causes disk 104 to rotate round axis 90. During this phase, relief 162 initially abuts against the end of the furthest cutout from base, runs across the entire cutout to abut against its other end. Once this abutment is reached, the basket is itself at the end of excursion relative to the arm, which indicates the arrival of the pre-cooler in operational position. It remains to secure it to the aircraft structure by means independent of those of the device. For implementing the method in order to install the pre-cooler, the base comprises a lever 180 illustrated in particular in FIGS. 25 and 26, and meant for sliding the pre-cooler upwards on the rear floor after its quarter turn rotation and prior to its hoisting in operative position. Lever 180 is articulated in rotation on the base round an axis 182 perpendicular to the arm support. Lever 180 has a generally planar shape perpendicular to said axis and presents a groove following circular arc 184 centered on said axis, and within which slides a plunger 186 rigidly secured to the base. The abutment of the plunger against each of the ends of the groove defines both end positions of the lever trajectory. In FIG. 25, the lever is resting by an edge against one of the walls of the basket. The lever includes a handle 190 extending further away from axis 182 than the distance between the lever fulcrum on the basket and the same axis. By operating handle 190, the lever therefore turns and causes the sliding of the pre-cooler down to the position shown in FIG. 26. During this movement, plunger 186 travels across the entire groove 184.

The method and device according to the invention is designed for installing and removing the pre-cooler without need to disassemble one of the thrust rods, a thrust reverser cowling, or the engine. Removal and installation are both done while closely controlling the pre-cooler movement and maintaining a minimum acceptable clearance between the latter and the rest of the elements installed on the pylon. Of course, many modifications to the invention can be made without departing from the scope thereof.

One can replace the jack by a rail, a sling, a string or a lever device. The trajectory taken by the pre-cooler under the control of the jack may vary from two circular arcs. It is thus possible to interpose between the two circular arcs a rectilinear trajectory corresponding to a translation movement. Guiding the pre-cooler during this movement can be done by means of rails, swing-type suspension, eccentrics, wedges, or use of human force. We can implement the pre-cooler rotation relative to the base through a system of anchors, ropes, or levers. In order to control the descent on the slide, reeving can be replaced by a manual winch, a lever, and/or a counterweight system.

The invention claimed is:

1. A device for installing and/or removing a pre-cooler of an aircraft engine, wherein the device comprises, in a position of use, a mounting flange being supported when used by an aircraft pylon, at least a floor carrying a pair of guiding arms, a ramp, a basket for receiving the pre-cooler, an adjustable support member of the pre-cooler for removing or mounting pre-cooler on the pylon, and a positioning device comprising a manual winch.

2. The device according to claim 1, wherein the device further comprises a handle attached to the pair of guiding arms and the positioning device for controlled displacement of the pre-cooler on the ramp.

3. The device according to claim 1, wherein the support member comprises a jack attached respectively to a support plate itself attached in a position of use to a part of the pylon, and a carried plate attached to the pre-cooler in a position of use.

4. The device according to claim 1, wherein the basket comprises a bottom and a disc mounted movably in rotation relative to the bottom round an axis perpendicular to a face of the disc, and in that the basket further comprises a self-disengaging locking member of the rotation.

5. The device according to claim 1, wherein the guiding arms are mounted articulated on the basket through respectively a disk guiding, when the basket in a position of use, relative to the mounting flange following two circular arcs having different centers.

6. The device according to claim 1, wherein the mounting flange has two legs shaped as a portion of a cylinder.

7. The device according to claim 1, wherein the ramp consists of a slide and a stand.

8. A method for removing an aircraft pre-cooler implementing a device as claimed in claim 1, wherein the method comprises:
    installing a support member,
    installing a mounting flange on thrust rods,
    installing a basket round the pre-cooler,
    attaching a guiding arm to the basket then to a base,
    removing the pre-cooler,
    displacing the support member guiding the pre-cooler along a trajectory following two circular arcs extending in a same vertical plane and having different centers,
    rotating the pre-cooler on the basket, and
    removing the pre-cooler on a ramp.

9. A method for mounting an aircraft pre-cooler implementing a device as claimed in claim 1, wherein the method comprises:
    installing a mounting flange on thrust rods,
    installing a basket round the pre-cooler,
    installing a ramp on a pylon,
    attaching a guiding arm to the basket,
    installing a handle on the pre-cooler and a positioning device,
    mounting the pre-cooler equipped with the basket on the mounting flange and rotating the basket on a base,
    mounting the guiding arm on the basket and the base,
    installing a support member,
    moving the support member driving the basket movement through the guiding arm, and
    securing the pre-cooler on the pylon.

* * * * *